United States Patent [19]
Boicey et al.

[11] 3,810,184
[45] May 7, 1974

[54] LAMINATED WINDSHIELD WITH BUILT-IN ANTENNA

[75] Inventors: James H. Boicey; Paul T. Mattimore; Otto J. Schmoeger, Jr., all of Toledo, Ohio

[73] Assignee: Libbey-Owens-Ford Company, Toledo, Ohio

[22] Filed: Feb. 17, 1972

[21] Appl. No.: 227,641

Related U.S. Application Data

[63] Continuation of Ser. No. 814,896, April 10, 1969, abandoned.

[52] U.S. Cl............... 343/713, 117/128.4, 343/873
[51] Int. Cl............................................. H01g 1/32
[58] Field of Search .......................... 343/711–713; 219/203, 522

[56] References Cited
UNITED STATES PATENTS

| | | | |
|---|---|---|---|
| 3,576,576 | 4/1971 | Jensen | 343/712 |
| 3,414,902 | 12/1968 | Shaw, Jr. | 343/713 |
| 3,440,408 | 4/1969 | Brittan | 219/203 X |

FOREIGN PATENTS OR APPLICATIONS

| | | | |
|---|---|---|---|
| 1,196,330 | 7/1965 | Germany | 219/522 |
| 1,134,802 | 8/1962 | Germany | 343/713 |
| 517,361 | 1/1940 | Great Britain | 343/713 |

*Primary Examiner*—Paul L. Gensler
*Attorney, Agent, or Firm*—Collins, Oberlin & Darr

[57] ABSTRACT

An automobile windshield of laminated glass having an indentation in the lower edge of one of the glass sheets, an antenna carried by the plastic interlayer and made up of fine wire elements that include horizontally extending elements and vertical elements that extend from the horizontal elements toward the bottom of the windshield, and a tinned metal plate also carried by the interlayer in alignment with the indentation in the glass sheet for connecting the antenna to the car radio.

7 Claims, 9 Drawing Figures

PATENTED MAY 7 1974
3,810,184
SHEET 1 OF 2
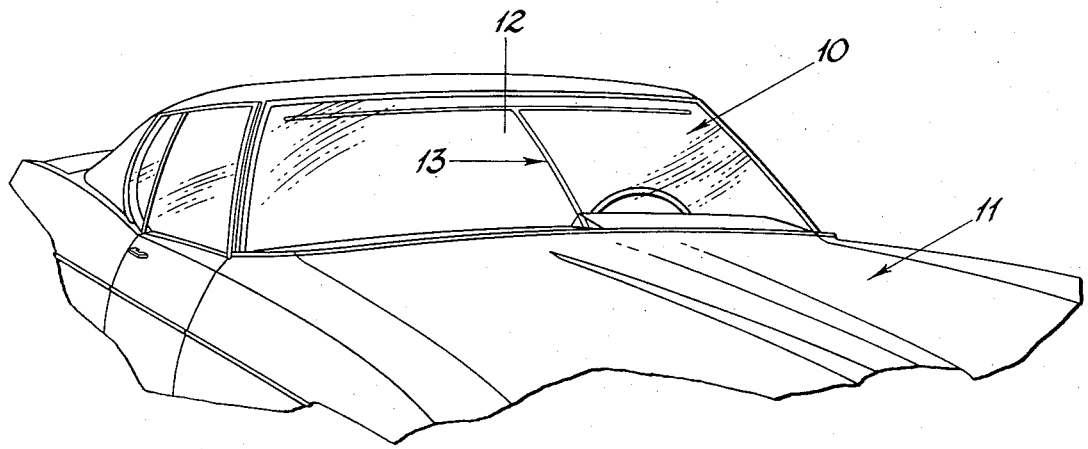
Fig. 1.
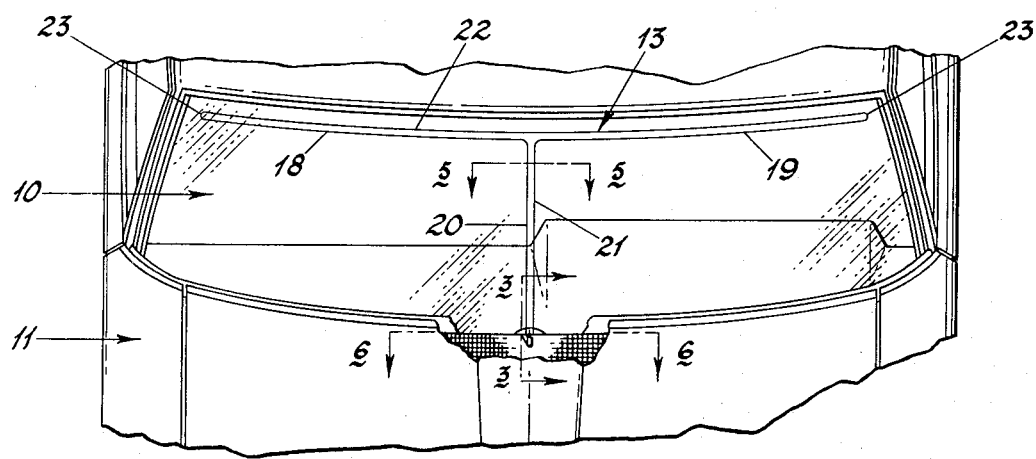
Fig. 2.
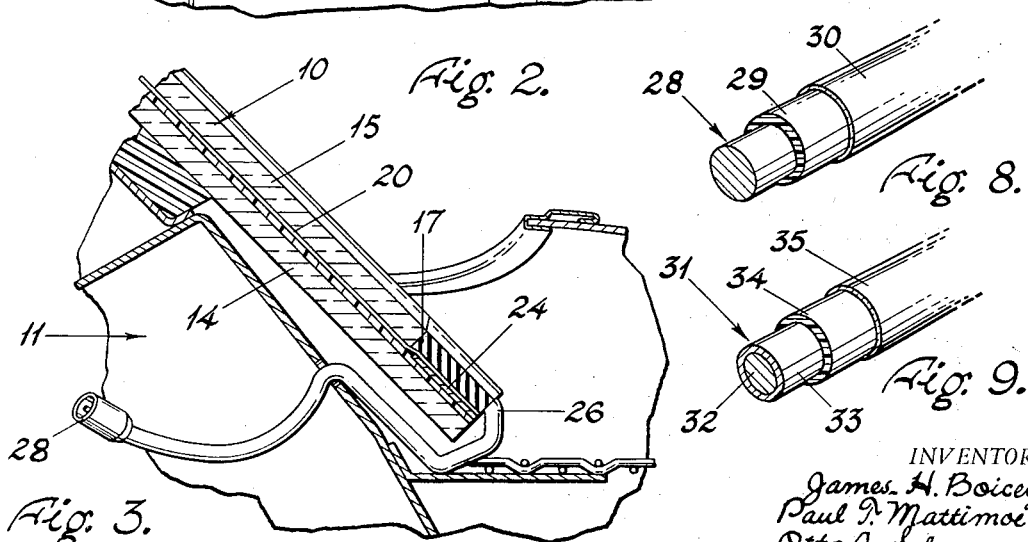
Fig. 3.
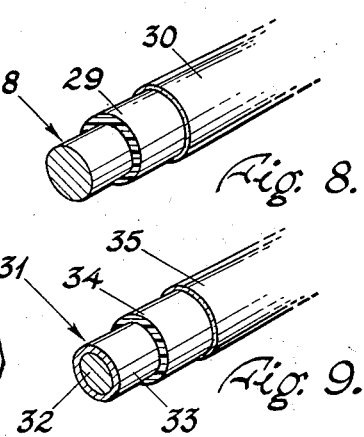
Fig. 8.
Fig. 9.
INVENTORS
James H. Boicey,
Paul T. Mattimoe and
Otto J. Schmoeger, Jr.
BY Collins & Oberlin
ATTORNEYS

LAMINATED WINDSHIELD WITH BUILT-IN ANTENNA

This is a continuation of application Ser. No. 814,896, filed Apr. 10, 1969, now abandoned.

BACKGROUND OF THE INVENTION

1. Field of the Invention

The present invention relates broadly to multi-ply glass sheet structures that carry an assembly of conducting elements therebetween, and more particularly to improvements in laminated safety glass windshields for automobiles that are provided with built-in radio antennas.

2. Description of the Prior Art

Heretofore automobile antennas have been almost exclusively of the familiar, so-called "buggy whip" or flexible, telescoping rod type that are standard equipment on most passenger cars. However these projecting rods detract from the overall streamlined effect desired in modern automotive designs and are extremely susceptible to breakage and loss from vandals and frequently encountered obstructions. Suggestions have accordingly been made that the antenna be concealed by locating it in other places on the car, including the windshield. (U.S. Pat. Nos. 3,208,070, issued Sept. 21, 1965 to James H. Boicey, and 3,414,902, issued Dec. 3, 1968 to H. E. Shaw, Jr.); but it was not until the special combination of windshield and antenna elements of this invention was conceived and made available that the idea of a windshield with a built-in antenna found wide acceptance in the automotive field as optional equipment on standard model cars.

SUMMARY OF THE INVENTION

According to the invention, there is provided a windshield antenna structure that is not only technically acceptable and economically feasible but also one that lends itself readily to production line installation on stock as well as custom built automobiles.

Thus, a primary object of the invention is the provision of a structure of this character in which the antenna is capable of functioning adequately for its intended purpose while, at the same time, being practically invisible and so not materially affecting the appearance of the windshield or obstructing vision through it.

Another object is to provide such a structure that can be mounted in the automobile and electrically connected to the radio system at least as easily as the prior known windshields and antennas are mounted and connected.

Further and more detailed objects and advantages of the invention will become apparent in the course of the following description when taken in connection with the accompanying drawings.

BRIEF DESCRIPTION OF THE DRAWINGS

In the drawings, wherein like numerals are employed to designate like parts throughout:

FIG. 1 is a fragmentary perspective view of the front end of an automobile provided with a windshield antenna structure of the invention;

FIG. 2 is a plan view of the same, with a portion of the hood or cowl of the automobile broken away to show details of the windshield-antenna structure;

FIG. 3 is a vertical, sectional view taken substantially along the line 3—3 in FIG. 2;

FIGS. 8 and 9 are perspective, sectional views of different types of wire that may be used for the antenna elements of the invention.

DESCRIPTION OF THE PREFERRED EMBODIMENTS

Figure 7:
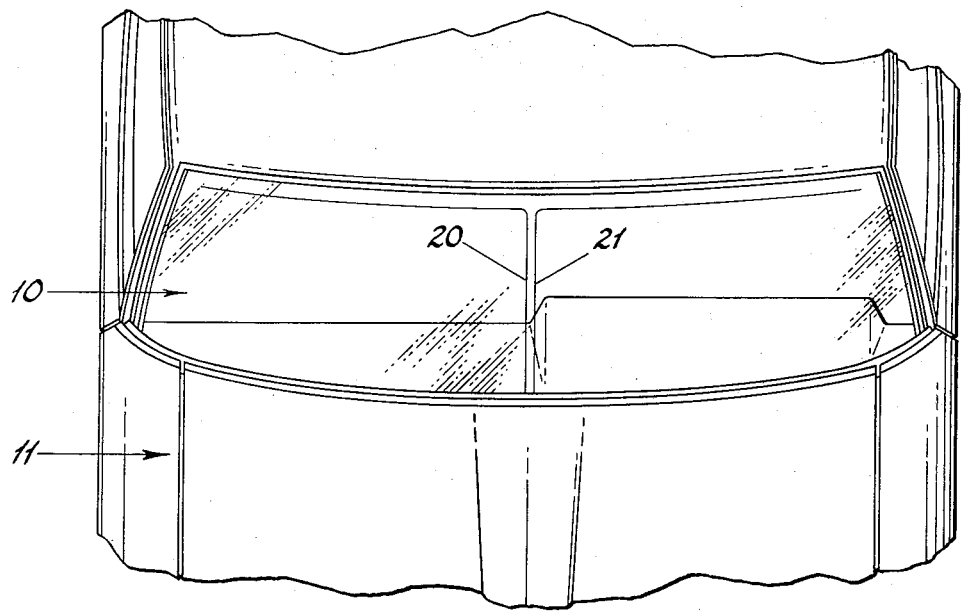
FIG. 7 is a view similar to FIGS. 1 and 2, but illustrating a somewhat different form of horizontal antenna element.

Referring now more particularly to the drawings, there is illustrated in FIGS. 1 to 6 a windshield-antenna structure 10, of the character contemplated by the invention, that is mounted in a conventional manner in an automobile 11; and, generally speaking, the structure 10 consists essentially of a windshield portion 12 with an antenna 13 built into it.

As shown in FIGS. 3 to 6 the windshield portion 12 is of the laminated safety glass type, being made up of two sheets of glass 14 and 15 and an interposed layer 16 of plastic all bonded together under heat and pressure to form a composite unit, and the lower edge of the outboard light or glass sheet 15 is notched or cut out prior to laminating to provide an indentation or opening 17 (FIGS. 2 to 4) in the finished windshield.

The antenna portion 13 of the structure 10 is contained between laminae of the windshield portion 12 and may be made up of fine wire elements which preferably include both horizontal wire elements 18 and 19 and vertical wire elements 20 and 21. The horizontal wire elements are located as near the upper edge of the windshield as consistent with adequate performance, for example from 1½ to 2 inches, and may be given a loop configuration as illustrated in FIGS. 1 and 2 by the provision of an upper horizontal wire element 22 and vertical connecting elements 23; or, they may be employed as simple straight line elements arranged in end to end relationship as shown in FIG. 7.

In any event the horizontal elements of the antenna are positioned well out of the critical sight areas in the windshield, and where a shade band is incorporated in the windshield or sun visors are used they will be completely hidden.

Similarly, the vertical wire elements 20 and 21, which may be approximately ½ inch apart, are located in the windshield midway between the driver and front seat passenger so that they are out of the critical sight area for either and will appear, if at all, only as a division line or lines. In addition to forming a part of the antenna pattern or configuration, these vertical wire elements also function as part of the special means for connecting the antenna-windshield structure to the radio that is an important feature of the invention.

Figures 4, 5, 6:
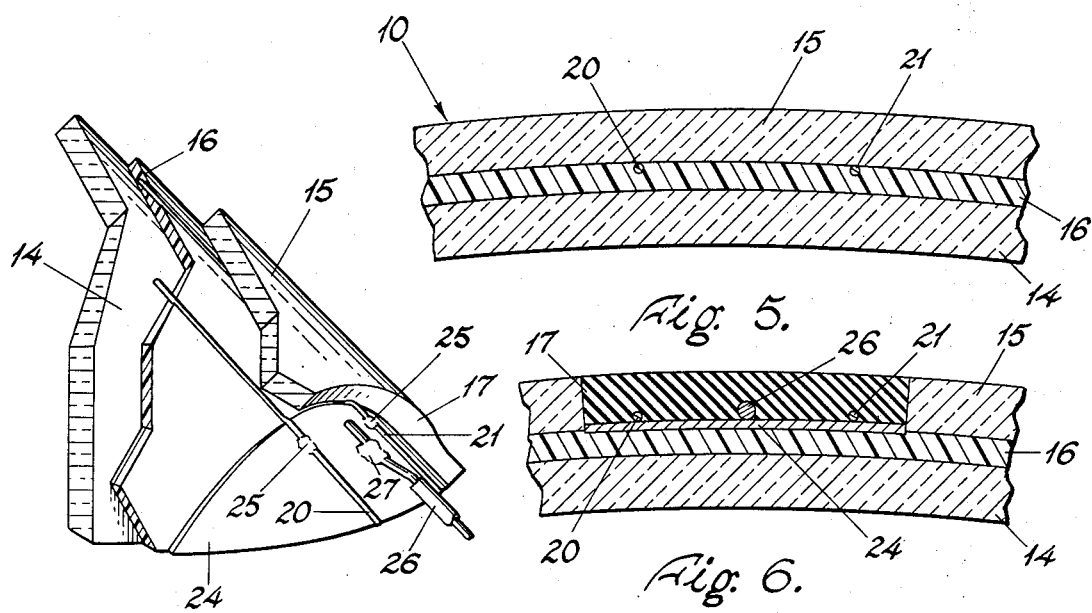
FIG. 4 is a quasi-perspective side elevation of portions of the windshield-antenna structure shown in FIG. 3, with parts broken away to show the connecting plate and associated parts more clearly.
FIG. 5 is a horizontal sectional view taken substantially along the line 5—5 in FIG. 2.
FIG. 6 is a similar view taken substantially along the line 6—6 in FIG. 2.

Thus, as can be seen in FIGS. 1 and 2, vertical wire elements 20 and 21 extend downwardly from the inner ends of the horizontal wire elements 18 and 19 respectively toward the bottom edge of the windshield and, as best shown in FIGS. 2 to 4, there is also provided between the laminae and in alignment with the identation 17 in the outboard lite of glass 15 a substantially crescent shaped metal connecting plate 24 over which the wires 20 and 21 extend and to which they are attached by welds or the like 25.

At this point it may be explained that, while the present invention is in no way limited to any specific method or apparatus for producing the windshield-antenna structure thereof, one suitable and relatively simple procedure for doing so involves securing the antenna portion 13 and the connecting plate 24 to or incorporating them in the plastic sheet that is to become the interlayer 16 before laminating it to the glass. This can be done, for example, by embedding both the wire elements of the antenna 13 and the connecting plate 24, which may be of thin sheet copper or steel, in the surface of the plastic sheet on the side that will face the outboard lite of glass 15 in the finished windshield (FIGS. 5 and 6) and with the ends of the wires 20 and 21 being allowed to overlap the connecting plate and then being welded thereto to produce the result in the finished article that is illustrated in FIGS. 3, 4 and 6.

Actually the connections 25 may be made by soldering or in any other electrically acceptable manner, as well as by welding, but they must employ materials or be made by procedures known to produce high temperature connections, i.e., connections capable of remaining intact and functional at the soldering temperatures normally used in making electrical connections so as to permit lead or other wires to be subsequently connected to and/or disconnected from the plate 24 by conventional methods without adversely affecting the high temperature connections between the plate and vertical wire elements of the antenna.

The plastic sheet, provided with and carrying the antenna and connecting plate as just described, is then assembled together with an inboard and a notched outboard light of glass and with the metal connecting plate in alignment with the opening resulting from the notched outboard light, and the parts of the assembly then laminated together under heat and pressure in an autoclave to produce a composite unitary structure. A suitable pig tail lead wire 26 (FIG. 4), which may be of tinned copper, is then soldered in the conventional manner to the tinned metal plate 24 to form a connection 27 and, as soon as this has been done, the identation 17 is filled with a heat and moisture resistant plastic sealing compound such as "Thiokol".

The resulting windshield-antenna structure 10 is then ready to and can be mounted in the windshield opening of an automobile in the same way that a conventional windshield for the same model is mounted. Also the lead 26 is preferably provided at its opposite end with an electrical connector, such as one half of a plug type fixture, 28 (FIG. 3) and, when this is done, installation of the device can be completed by simply plugging the connector 27 into the radio of the car.

It has already been pointed out that the location, the pattern and the size of the fine wire elements that make up the antenna portion 13 of the structure 10 are such that they lie outside the critical viewing areas of the windshield, that substantial parts of them are rendered invisible by such widely used accessories as sun visors and shade bands, and that they can never appear as anything other than a very fine line under any circumstances.

Nevertheless, the invention contemplates further improving the optical properties of the structure by employing as antenna elements very fine wires that have been selected and treated to impart physical characteristics that render them practically invisible to the naked eye under most commonly encountered driving conditions, and there is illustrated in FIGS. 8 and 9 two types of wire that have proved in actual trials to be suitable for the purpose.

In each case the wire is of metal, in a diameter of around 0.005 to 0.0065 inch and darkened or blackened to reduce light reflectance. Thus, the wire 28 of FIG. 8 may be of copper, or of a copper alloy such as copper-cadmium, covered first with a coating 29 of a black plastic approximately 0.001 inch thick and then with an outer coating 30 of transparent plastic from about 0.0005 to 0.001 inches thick. The wire 31 of FIG. 9 differs from the wire 28 by being made up of a copper core 32, plated with silver as at 33, but both the copper alloy and the plated wire are preferably around 0.005 of an inch in diameter and the latter is provided with similar superimposed darkened and transparent coatings 34 and 35 respectively.

The choice of metal to use in the wire depends primarily on the resistivity and degree of flexibility required and bare uncoated wire can be used if it is chemically treated or oxidized sufficiently to darken its outer surface to a point where it becomes relatively unnoticeable in use. However, generally speaking it is preferred to cover the wire with a coating such as a dark plastic. This may be a suitably colored resin. For example, polyvinyl formal resin pigmented with carbon black has given excellent results and avoids undesirable bleeding of the colorant into the plastic interlayer which, if it occurred, would cause the wire to appear heavier than it actually is. This resin also has additional advantages of serving as insulation and being heat resistant. The outer transparent coating is preferably of a material such as polyvinyl butyral which will insure the wire's being capable of adhering to the plastic interlayer during assembly and laminating but, in accordance with this invention, the transparent outer coating has the further advantage that, by careful selection and control of thickness, its refractive index can be adjusted toward a match with that of the plastic interlayer and a resulting theoretical invisibility in the windshield-antenna structure.

It will be appreciated that the special arrangement of the connector plate in alignment with the opening or indentation in the glass sheet permits the pig tail lead wire 26 to enter the windshield from any angle to its face as well as from the edge thereof (FIG. 3); and that, in addition to facilitating an original installation of the windshield-antenna structure, this greatly simplifies repair and replacement.

Further it should be realized that the concept of a multi-ply or laminated structure including an assembly of conducting elements between the plies or laminations such as here disclosed can be adapted for uses other than as antennas; that both the elongated and the plate-like conducting elements contemplated may be of metal that has been painted or printed as well as being in the form of thin wires and/or sheets; and that, as antennas, they may be used with either AM or FM radio equipment and for sending as well as receiving.

In fact it is to be understood that the forms of the invention herewith shown and described are to be taken as illustrative embodiments only of the same and that various changes in the shape, size, arrangement and character of the parts may be resorted to without departing from the spirit of the invention as defined in the following claims.

We claim:

1. In an automobile windshield including two sheets of glass and a layer of plastic interposed between and heat and pressure laminated together with said glass sheets; a radio antenna circuit secured at and along a surface of one of said glass sheets and comprising an elongated substantially horizontal line of conducting material adjacent and extending substantially parallel with the top of said windshield, and a substantially vertical line of conducting material extending downwardly from said horizontal line between the ends of said windshield and terminating adjacent the bottom thereof in an enlarged area of conducting material which provides a connecting tab for said antenna circuit; with said layer of plastic securing said circuit along said glass surface, one of said sheets of glass having a notch in an edge thereof, and said notch being in alignment with said connecting tab.

2. A windshield structure as defined in claim 1 in which said lines are wires, said enlarged area of conducting material is a flat metal plate, one of said sheets of glass has a notch in an edge thereof, said circuit is carried by said plastic sheet on the side thereof facing said notched sheet, and said notch is in alignment with said flat plate.

3. A windshield structure as defined in claim 2 in which said plate is tinned, said vertical wire is welded to said plate, said connection facilitating element is a lead wire carrying a plug type connector at its free end, said lead wire is soldered to said plate, and said notch is filled with a sealing material.

4. A structure as defined in claim 2 in which said horizontal and vertical wires are darkened to reduce visibility and light reflectance and arranged to form a pattern composed of two inverted "L" shapes arranged back to back and the lower ends of said vertical wires are welded to said metal plate.

5. A structure as defined in claim 4 in which said wires are coated with a pigmented plastic material.

6. A structure as defined in claim 5 in which said wires are provided with superimposed coatings of a pigmented plastic and a clear plastic material respectively.

7. A structure as defined in claim 6 in which the plastic of the coating material is a polyvinyl formal resin, the pigment is carbon, and said clear plastic coating material has an index of refraction substantially matching that of said plastic interlayer.

* * * * *